US012351275B2

(12) United States Patent
Sugitate

(10) Patent No.: US 12,351,275 B2
(45) Date of Patent: Jul. 8, 2025

(54) MARINE VESSEL

(71) Applicant: HONDA MOTOR CO., LTD., Tokyo (JP)

(72) Inventor: Kenta Sugitate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 17/901,882

(22) Filed: Sep. 2, 2022

(65) Prior Publication Data

US 2024/0076025 A1 Mar. 7, 2024

(51) Int. Cl.

| | |
|---|---|
| ***B63B 21/24*** | (2006.01) |
| ***B63B 21/26*** | (2006.01) |
| ***B63H 21/17*** | (2006.01) |
| ***B63J 3/04*** | (2006.01) |
| ***F03B 13/10*** | (2006.01) |
| ***F03B 17/06*** | (2006.01) |

(52) U.S. Cl.

CPC .............. *B63B 21/24* (2013.01); *B63B 21/26* (2013.01); *B63H 21/17* (2013.01); *F03B 13/10* (2013.01); *F03B 17/06* (2013.01); *F03B 17/061* (2013.01); *B63J 2003/046* (2013.01)

(58) Field of Classification Search

CPC ......... B63B 21/24; B63B 21/26; B63B 21/29; B63B 21/30; B63B 21/50; B63H 21/17; B63J 3/04; B63J 2003/046; F03B 13/10; F03B 17/06; F03B 17/061

USPC ............ 114/294–310; 440/6; 290/42, 43, 53

See application file for complete search history.

(56) References Cited

U.S. PATENT DOCUMENTS 3,754,439 A * 8/1973 Bauer ..................... B63B 21/29 73/170.16
5,970,901 A * 10/1999 Bruce ..................... B63B 21/00 73/152.01
6,626,638 B2 * 9/2003 Rosefsky ................. B63H 1/12 415/908
7,077,072 B2 * 7/2006 Wingett ................ H02J 7/1415 114/322
7,199,484 B2 * 4/2007 Brashears ............... F03B 13/10 290/43
7,726,911 B1 * 6/2010 Dempster ............... B63B 35/44 114/256
8,791,589 B2 * 7/2014 Colello ................... B60L 53/51 307/9.1
10,358,042 B2 * 7/2019 Nemoto ............... H02K 7/1823
11,967,853 B1 * 4/2024 Hanson, Jr. ............ B63G 8/001

(Continued)

FOREIGN PATENT DOCUMENTS

JP 2017-218016 12/2017

*Primary Examiner* — Ajay Vasudeva

(74) *Attorney, Agent, or Firm* — Amin, Turocy & Watson, LLP

(57) ABSTRACT

A marine vessel (10) includes a hull (11), an electric propulsion part (15) configured to propel the hull (11), an anchor part (20) that is connected to a chain cable (21) pulled out from the hull (11) and is submerged in water, a power generating part (63) submerged in water together with the anchor part (20), and a battery case (30) configured to accommodate a detachable portable battery (35) that is an electric power source of the electric propulsion part (15), wherein the battery case (30) is integrated with the anchor part (20) and connected to the power generating part (63).

8 Claims, 6 Drawing Sheets

(56) References Cited

U.S. PATENT DOCUMENTS

2012/0091942 A1 * 4/2012 Jones ........................ F03G 7/05
320/101

* cited by examiner

MARINE VESSEL

BACKGROUND OF THE INVENTION

Field of the Invention

The present invention relates to a marine vessel.

Background Art

In recent years, in order to ensure access to affordable, reliable, sustainable and advanced energy for more people, research and development are being carried out on secondary batteries that contribute to energy efficiency.

In addition, in recent years, efforts to provide access to a sustainable transportation system that considers vulnerable people such as aged people or children among traffic participants are becoming active. To realize this, research and development on further improving safety or convenience of traffic through marine vessel-related development are being focused on.

A marine vessel propelled by an electric motor cruises by supplying electric power to a propulsion device from a battery as a power supply.

Patent Document 1 (Japanese Unexamined Patent Application, First Publication No. 2017-218016) discloses a marine vessel that includes a marine vessel propulsion machine including an engine and an electric motor. A propeller is provided in the marine vessel propulsion machine. Further, both the engine and the electric motor are configured to generate power to rotate the propeller. In addition, the marine vessel includes a starter motor, and a battery that supplies electric power to the starter motor.

The starter motor is configured to start the engine using electric power from a first battery. In addition, the electric motor is configured to rotate the propeller using electric power from the second battery. In addition, while not clearly described in the above-mentioned Patent Document 1, in general, a marine vessel including a marine vessel propulsion machine includes a third battery configured to supply electric power to another instrument in the marine vessel, in addition to the first battery and the second battery configured to drive the propeller, in order to secure reliable driving of the propeller.

SUMMARY OF THE INVENTION

However, in the related art, it is assumed that the battery will be charged in advance during anchorage at a port or the like and the propulsion device is driven to cruise. However, since a battery is a heavy substance weighing at least several kg or dozens of kg and a hull weight increases when the loaded batteries are increased to increase a cruising distance, cruising efficiency may decrease. In addition, it is not disclosed that the battery is removable and rechargeable.

It is easy to charge a ground running vehicle or the like at a place of arrival after running. On the other hand, in a marine vessel such as a fishing boat or the like, it is conceivable that charging may not be possible in the anchorage area after cruising. In the marine vessel, compared to the ground running vehicle or the like, the influence of electric power loss during cruising or the like is greater. For this reason, there is a demand to ensure recharging or the like of the battery, and there is room for improvement in the related art.

In consideration of the above-mentioned circumstances, the present invention is directed to accomplishing the purpose of providing a marine vessel capable of increasing a cruisable distance and further enabling efficient charging of the battery while suppressing an increase in hull weight. Further, by extension, it contributes to efficiency of energy. Further, by extension, it contributes to development of a sustainable transportation system.

(a) A marine vessel (10) according to an aspect of the present invention includes:

a hull (11);

an electric propulsion part (15) configured to propel the hull (11);

an anchor part (20) that is connected to a chain cable (21) pulled out from the hull (11) and is submerged in water;

a power generating part (63) submerged in water together with the anchor part (20); and a battery case (30) configured to accommodate a detachable portable battery (35) that is an electric power source of the electric propulsion part (15), wherein the battery case (30) is integrated with the anchor part (20) and connected to the power generating part (63).

(b) The marine vessel (10) of the above-mentioned aspect can include a cable (38*b*) configured to connect the battery case (30) to the power generating part (63).

(c) In the marine vessel (10) of the above-mentioned aspect, the power generating part (63) can be able to generate power using water flow.

(d) In the marine vessel (10) of the above-mentioned aspect, the anchor part can have a shank which is connected to the chain cable and on which the battery case is formed.

(e) In the marine vessel (10) of the above-mentioned aspect, the anchor part (20) can have a stock (24) which crosses a shank (22) connected to the chain cable (21) and along which the battery case (30) is disposed.

(f) In the marine vessel (10) of the above-mentioned aspect, the anchor part (20) can have an anchor head (28) on which the battery case (30) is disposed.

(g) In the marine vessel (10) of the above-mentioned aspect, the anchor part (20) can have a shank (22) connected to the chain cable (21) and a fluke part (23), and the battery case (30) can be disposed at a position where the shank (22) is connected to the fluke part (23).

(h) In the marine vessel (10) of the above-mentioned aspect, the battery case (30) can be the anchor part (20).

According to the marine vessel of the above-mentioned (a), since the battery case configured to accommodate the detachable portable battery that supplies electricity to the electric propulsion part used in cruising is integrated with the anchor part, during anchorage of the marine vessel, the battery case and the anchor part are submerged on the bottom of water as the anchor, and the detachable portable battery can be charged by electric power generated by the connected power generating part. Accordingly, the weight corresponding to the anchor in the related art can be used as the power supply.

Accordingly, the cruising distance can be increased without increasing the hull weight. Further, the electric power of the detachable portable battery can be used during cruising by mounting the detachable portable battery charged during the anchorage into the battery case that supplies electricity to the electric propulsion part.

Since the detachable portable battery has a capacity that can be fully charged for an anchorage time to go fishing or the like, the detachable portable battery that has finished charging is pulled up and replaced with the detachable portable battery that has finished discharging, and thus it is possible to enable cruising such as fishing with high energy circulation. While cruising is performed by increasing the load weight to be carried in the electric marine vessel and increasing the hull weight in the anchor of the related art, in the present invention, since the detachable portable battery is loaded on the hull as an energy source and moved, an operation with high energy efficiency is possible.

In addition, since the battery case integrated with the anchor part is connected to the hull only by the chain cable like in the related art, there is no need to run the cable along the chain cable. Accordingly, the cable need not have strength comparable to the chain cable. Further, the length of the cable required to maintain hermeticity can be shortened. Accordingly, it is possible to solve the problems of difficult handling and high cost of the copper material that makes up the power transmission line.

Since the battery case that accommodates the detachable portable battery, which is a heavy substance, is submerged in water together with the anchor part, it is possible to exhibit sufficient holding power as the anchor.

According to the marine vessel of the above-mentioned (b), the detachable portable battery accommodated in the battery case via the cable can be charged by electric power generated by the connected power generating part. Accordingly, the detachable portable battery can be charged only near the bottom of water regardless of movement on the marine vessel during anchorage in which the anchor is cast.

In addition, since the battery case integrated with the anchor part is connected to the hull only by the chain cable as in the related art, there is no need to run the cable along the chain cable. Accordingly, the length of the cable required to maintain the hermeticity is only the length of the cable that connects the battery case to the power generating part, making it easy to maintain the hermetic state.

According to the marine vessel of the above-mentioned (c), since tidal power generation can be performed by the power generating part that can obtain the electric power from the sea bottom tidal current or the like, the battery case and the power generating part submerged on the bottom of water during anchorage can charge the detachable portable battery without any electrical connection to the marine vessel other than the chain cable. Since the battery case and the power generating part do not need to be electrically connected to the marine vessel other than through the chain cable, it is possible to charge the detachable portable battery only near the bottom of water regardless of the movement on the marine vessel during anchorage in which the anchor is cast.

According to the marine vessel of the above-mentioned (d), by forming the battery case on the shank closest to the chain cable, the load or impact applied to the battery case at the bottom of water can be reduced, the hermeticity of the battery case can be easily maintained, and at the same time, the required holding power can be exhibited. In addition, by forming the battery case on the shank instead of the fluke part that is grounded at the bottom of water, the load or impact applied to the battery case at the bottom of water can be reduced.

According to the marine vessel of the above-mentioned (e), by disposing the battery case along the stock, the load or impact applied to the battery case at the bottom of water can be reduced, hermeticity of the battery case can be easily maintained, and at the same time, the required holding power can be exhibited. In addition, by disposing the battery case along the stock instead of the fluke part that sinks to the bottom of water, the load or impact applied to the battery case at the bottom of water can be reduced.

According to the marine vessel of the above-mentioned (f), by forming the battery case on the anchor head, the load or impact applied to the battery case at the bottom of water can be reduced, hermeticity of the battery case can be easily maintained, and at the same time, the required holding power can be exhibited. In addition, by disposing the battery case in the vicinity of the anchor head instead of the fluke part that sinks to the bottom of water, the load or impact applied to the battery case at the bottom of water can be reduced.

According to the marine vessel of the above-mentioned (g), by forming the battery case at the position where the shank is connected to the fluke part, the load or impact applied to the battery case at the bottom of water can be reduced, hermeticity of the battery case can be easily maintained, and at the same time, the required holding power can be exhibited. In addition, by forming the battery case at the connecting position of the fluke part and the shank instead of the fluke part that is grounded at the bottom of water, and at the same time, instead of the shank itself to which a towing force is applied, the load or impact applied to the battery case at the bottom of water can be reduced.

According to the marine vessel of the above-mentioned (h), since the battery case (30) itself can be submerged into the sea as the anchor part (20) and the battery case that accommodates the detachable portable battery, which is a heavy substance, is submerged in water as the anchor part itself, it is possible to exhibit sufficient holding power as the anchor.

Effects of the Invention

According to the aspect of the present invention, effects can be achieved that it is possible to provide the marine vessel capable of increasing a cruisable distance and efficiently charging the battery while suppressing an increase in the hull weight.

EMBODIMENTS

Hereinafter, a first embodiment of a marine vessel according to the present invention will be described with reference to the accompanying drawings.

Figure 1:
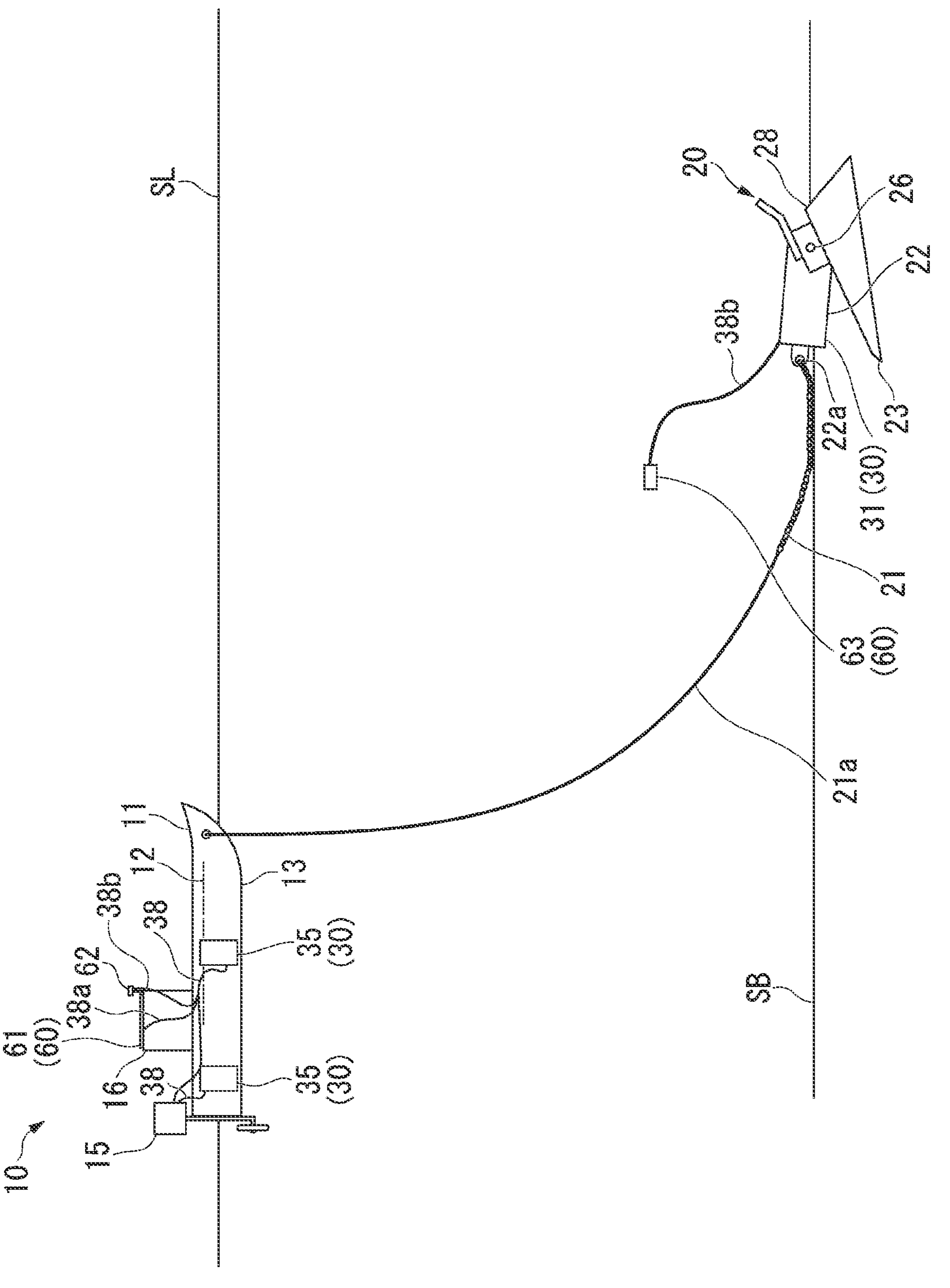
FIG. 1 is a schematic view showing an anchoring state in a first embodiment of a marine vessel according to the present invention.

FIG. 1 is a schematic view showing an anchoring state of the marine vessel according to the embodiment. In the drawing, reference sign 10 designates the marine vessel.

The marine vessel 10 according to the embodiment includes, as shown in FIG. 1, a hull 11, an electric propulsion part 15, an anchor part 20, a battery case 30, a detachable portable battery 35 accommodated in the battery case 30, and a power generating part 63.

The electric propulsion part 15 is attached to the hull 11. The electric propulsion part 15 propels the hull 11. The electric propulsion part 15 has a motor such as an electric motor or the like, and is provided on the hull 11. The electric propulsion part 15 is driven by the detachable portable battery 35 that is an electric power source provided on the hull 11. The hull 11 can advance and retreat with driving of the electric propulsion part 15. While the electric propulsion part 15 is an outboard engine in the embodiment, it is not limited to this configuration, and for example, may be an inboard-outdrive engine or an inboard engine.

The hull 11 is provided with the anchor part 20.

Figure 2:
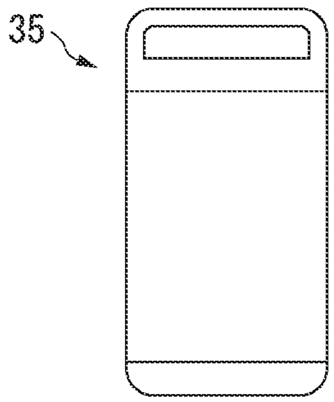
FIG. 2 is a schematic front view showing a detachable portable battery in the first embodiment of the marine vessel according to the present invention.

FIG. 2 is a schematic front view showing a detachable portable battery mounted on the marine vessel according to the embodiment.

The hull 11 accommodates the detachable portable battery 35 that is the electric power source of the electric propulsion part 15.

The detachable portable battery 35 is, as shown in FIG. 2, a battery pack that can be simply removed and replaced, i.e., a detachable portable secondary battery. The detachable portable battery 35 can carry electricity in small quantities and can be used by being replaced instead of charged. The detachable portable battery 35 can be expanded to various uses such as electric mobility on land, a stationary battery at home that is not limited to mobility, an outdoor portable power supply, or the like, and can be used to construct a battery-shared system network. The detachable portable battery 35 has a feature of a mobile power pack that is replaced with another fully charged battery when a remaining battery capacity is low.

Figure 3:
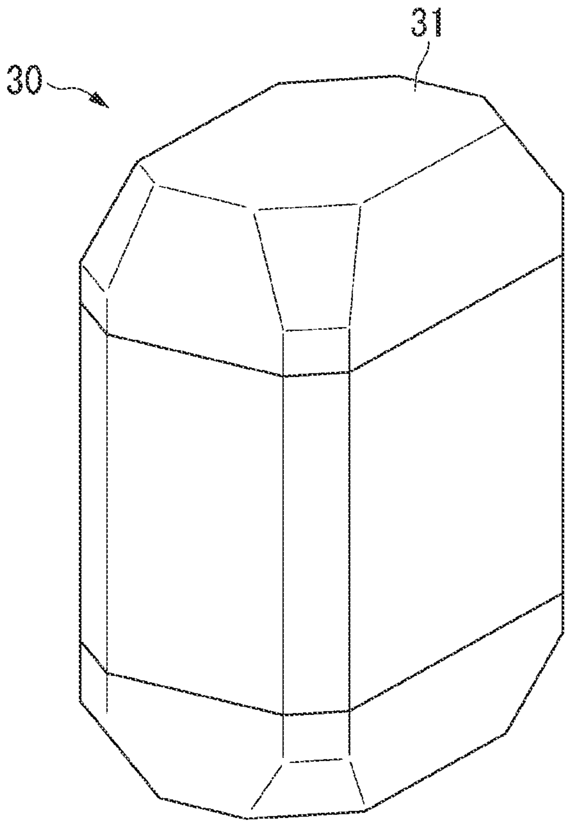
FIG. 3 is a schematic perspective view showing a battery case in the first embodiment of the marine vessel according to the present invention.

FIG. 3 is a schematic perspective view showing a battery case mounted on the marine vessel according to the embodiment.

The detachable portable battery 35 can be accommodated in the battery case 30. As shown in FIG. 3, the battery case 30 can hermetically accommodate the plurality of detachable portable batteries 35. The battery case 30 has a lid part on one end 31, which is able to be opened and closed. The battery case 30 has an accommodating concave section configured to accommodate the detachable portable battery 35 therein, which is exposed when the lid part is open. The battery case 30 is hermetically closed by closing the lid part after the detachable portable battery 35 is inserted into the accommodating concave section. That is, the one end 31 indicates a position where the detachable portable battery 35 is inserted into or removed from the battery case 30 and a direction in which the detachable portable battery 35 is inserted or removed.

The battery case 30 is provided with a cable 38 connected to the electric propulsion part 15.

The electric propulsion part 15 can be driven to advance and retreat the hull 11 by supplying electric power to the electric propulsion part 15 from the detachable portable battery 35 accommodated in the battery case 30 via the cable 38.

The battery case 30 can charge the accommodated detachable portable battery with electric power supplied from a charging part 60, which will be described below.

In the embodiment, the battery case 30 is disposed from a marine vessel bottom 13 to a deck 12 in the hull 11. The plurality of battery cases 30 are disposed in the hull 11. The battery case 30 may be mounted on the marine vessel bottom 13. The battery case 30 may be disposed above the deck 12. The battery case 30 can be mounted on the hull 11 in front of a steering house 16. The battery case 30 can be mounted on the hull 11 behind the steering house 16.

Further, the cable 38*b* connected to the charging part 60 may be provided in the battery case 30 mounted on the hull 11. The charging part 60 may be configured to generate electricity from a renewable energy source. The charging part 60 has an electric circuit or the like required to charge the detachable portable battery 35 with the generated electric power. The charging part 60 may be a solar photovoltaic power generating part 61 provided on the steering house 16 or the deck 12. Alternatively, the charging part 60 may be a wind power generating part 62 provided on the steering house 16 or the deck 12.

Further, the charging parts 60 of those may also be connected to the battery cases 30 mounted on the hull 11 by the cables 38*a*, respectively. In addition, the battery case 30, the charging part 60 and the electric propulsion part 15 may be configured to be switched and connected.

When the detachable portable battery 35 accommodated in the battery case 30 is charged by the charging part 60 and a charged capacity of the detachable portable battery accommodated in the battery case 30 used as a driving power supply connected to the electric propulsion part 15 via the cable 38 is reduced, they can be exchanged. Accordingly, even when the charged capacity of the detachable portable battery 35 that is supplying electric power to the electric propulsion part 15 as a power supply during cruising of the marine vessel 10 is decreased, the electric power supplied to the electric propulsion part 15 by exchange of the detachable portable battery 35 can be maintained and cruising of the marine vessel 10 can be continued.

Figure 4:
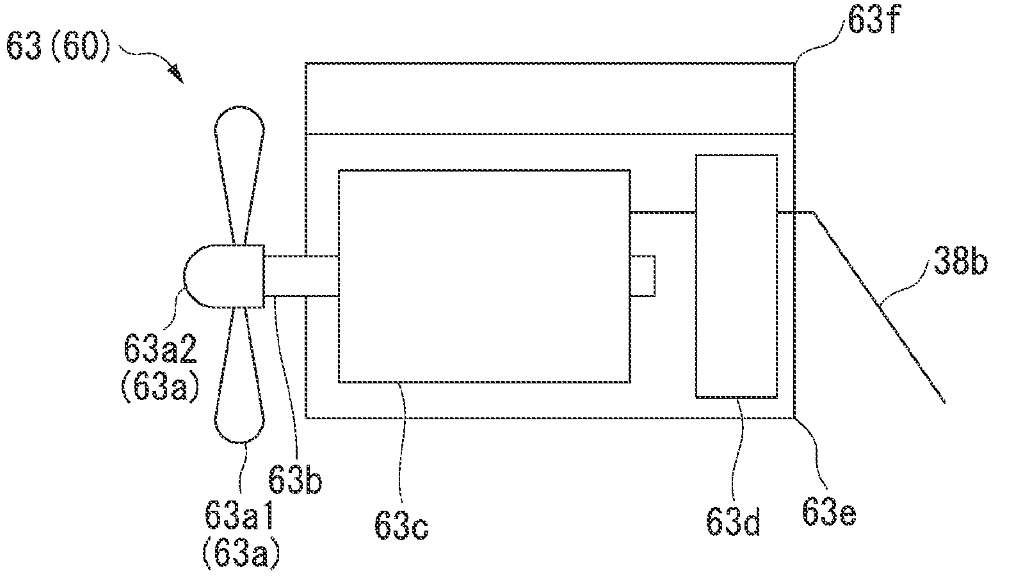
FIG. 4 is a schematic view showing a power generating part in the first embodiment of the marine vessel according to the present invention.

FIG. 4 is a schematic view showing a power generating part according to the embodiment.

The power generating part 63 has a configuration that enables tidal power generation. As shown in FIG. 4, the power generating part 63 is a device that is suspended in water, rotates a turbine 63*a* with a water flow, and generates electricity by rotating the turbine 63*a*. For example, the water flow power generating apparatus (the power generating part) 63 is used when it is submerged in the sea and generates electricity by means of an ocean stream.

The power generating part 63 is configured by providing the turbine 63*a* on a rear portion of a floating body case 63*e*. The floating body case 63*e* of the power generating part 63 is constituted by, for example, a hollow tubular body that closes a front portion and a rear portion. Further, in the floating body case 63*e*, the front portion means a portion directed toward an upstream side in a direction along the water flow when power generation is possible, and the rear portion means a portion directed toward a downstream side of the water flow. In addition, the forward means an upstream direction in a direction along the water flow when power generation is possible, and the rearward means a downstream direction of the water flow.

The turbine 63*a* is located outside behind the floating body case 63*e*. The turbine 63*a* includes a blade 63*a*1 and a hub 63*a*2. The blade 63*a*1 is a blade member configured to receive water flow and generate a rotating force. The plurality of blades 63*a*1 are provided on an outer circumference of the hub 63*a*2 in the radial direction. The turbine 63*a* may include two blades 63*a*1. The turbine 63*a* may include three or more blades 63*a*1. The hub 63*a*2 is provided on a rear end of a rotary shaft 63*b*. The rotary shaft 63*b* is rotatable about an axis of the floating body case 63*e* in the forward/rearward direction. The rotary shaft 63*b* is a rotary shaft of a generator 63*c*. The blade 63*a*1, the hub 63*a*2 and the rotary shaft 63*b* are rotated integrally.

The generator 63*c* is a machine configured to convert kinetic energy of rotation of the turbine 63*a* into electric energy. The generator 63*c* receives a rotating force of the turbine 63*a* to generate electricity. An electric circuit part 63*d* such as a power conditioner, a power reception part, or the like, is connected to the generator 63*c*. The power conditioner performs adjustment and generation driving control of output (voltage, current, generated electric power) of the generator 63*c*. The power reception part transforms the output into alternating current electric power or the like. The electric power output from the power reception part is transmitted to the battery case 30 through the power transmission cable (cable) 38*b*. A system control part is connected to the power conditioner or the power reception part. The power conditioner, the power reception part, and the system control part constitute the electric circuit part 63*d*. The electric circuit part 63*d* is accommodated in the floating body case 63*e*.

A floating body portion 63*f* is provided on an upper portion of the floating body case 63*e*. The floating body portion 63*f* exerts a predetermined buoyant force underwater, and maintains the floating body case 63*e* at a predetermined position underwater. Further, the floating body portion 63*f* may also be said to be the floating body case 63*e*. Specifically, as the floating body portion 63*f*, the inside of the floating body case 63*e* can be filled with air and sealed. In this case, the floating body case 63*e* is not limited to this configuration as long as the attitude of the floating body case 63*e* can be maintained to generate power against the water flow.

The power transmission cable 38*b* is attached to a front portion of the floating body case 63*e*. The power transmission cable 38*b* functions as a mooring rope. The power transmission cable 38*b* is pulled out from the floating body case 63*e*. A mooring rope may be provided separately from the power transmission cable 38*b*. In this case, the power transmission cable 38*b* is disposed along the mooring rope. The power transmission cable 38*b* is a cable configured to transmit the generated electric power. The power transmission cable 38*b* may be configured to be hooked to the mooring rope at a predetermined interval and not separated from the mooring rope.

The power transmission cable 38*b* is connected to the battery case 30. Alternatively, the mooring rope can be connected to the battery case 30.

As shown in FIG. 1, the battery case 30 to which the power transmission cable 38*b* is connected is configured integrally with the anchor part 20.

The anchor part (anchor) 20 is a weight used to anchor the hull 11 at sea. The anchor part (anchor) 20 is used when anchoring the hull 11 in the offshore see or the like.

The anchor part 20 includes a ring 22*a*, a shank 22, and a fluke part 23.

The anchor part 20 is connected to the hull 11 by an anchor rope 21*a* and a chain cable (anchor chain) 21. The anchor rope 21*a* connects the anchor part 20 sunk on a sea bottom SB, and the hull 11 floating on a sea surface SL. The anchor rope 21*a* is a portion of the configuration, which approaches the hull 11, of connecting the anchor part 20 and the hull 11. The chain cable (anchor chain) 21 is a portion of the configuration, which approaches the anchor part 20, of connecting the anchor part 20 and the hull 11. The chain cable (anchor chain) 21 increases holding power of the anchor part 20 by lying on the sea bottom SB. The chain cable (anchor chain) 21 is a chain of iron rings.

One end of the chain cable (anchor chain) 21 is connected to the anchor rope 21*a*. The other end of the chain cable (anchor chain) 21 is connected to the ring 22*a*. The ring 22*a* is provided on one end of the shank 22. The other end of the shank 22 is called an anchor head 28. The fluke part 23 having a plate shape is connected to the anchor head 28.

The fluke part 23 is rotatable with respect to a rotary shaft 26 perpendicular to the shank 22 from a position parallel to the shank 22 to a predetermined angle defined as an acute angle. The fluke part 23 cuts into the sea bottom SB and provides the holding power to keep the hull 11 in place. FIG. 1 shows a state in which the fluke part 23 has cut into the sea bottom SB. The anchor part 20 may have a stock parallel to the rotary shaft 26.

After the anchor part 20 is thrown into the sea during anchorage, the fluke part 23, which is a claw connected to the anchor head 28 of the tip of the anchor part 20, is operated, and holding power, which is a resistance force, is created by filling the fluke part 23 with the soil of the sea bottom SB.

In the anchor part 20 of the embodiment, the shank 22 is the battery case 30. That is, the detachable portable battery 35 is accommodated in the shank 22 of the anchor part 20. The power generating part 63 is connected to the battery case 30 of the shank 22 via the power transmission cable 38*b*.

The battery case 30 of the shank 22 is disposed such that the one end 31 provided on the lid part approaches the ring 22*a* in the shank 22.

The marine vessel 10 of the embodiment cruises by supplying electric power to the electric propulsion part 15 from the detachable portable battery 35 via the cable 38 using the detachable portable battery 35 accommodated in the battery case 30 mounted on the hull 11 as a power supply.

After arrival at the predetermined anchorage position, supply of the electric power from the detachable portable battery 35 is stopped, and driving of the electric propulsion part 15 is stopped. In addition, the anchor part 20 is anchored into the sea. Here, the power generating part 63 and the cable 38*b* are also thrown into the sea. In advance, in the anchor part 20 before thrown into the sea, the detachable portable battery 35 is accommodated in the battery case 30.

The anchor rope 21*a* having a predetermined length extends from the vicinity of the sea surface SL, and the chain cable (anchor chain) 21 and the anchor part 20 are attached to the sea bottom SB. According to a procedure of the predetermined anchoring, the fluke part 23 bites into the sea bottom, and holding power of the anchor part 20 is generated.

The power generating part 63 is connected to the anchor part 20 via the power transmission cable 38*b*. Then, the power generating part 63 maintains the floating body case 63*e* at a predetermined depth position in the sea due to a balance between the weight of the power transmission cable 38*b* and the buoyant force of the floating body portion 63*f*. In addition, the floating body case 63*e* maintains a direction thereof along the water flow such that the end portion connected to the power transmission cable 38*b* is directed forward and the blade 63*a*1 of the turbine 63*a* is directed rearward due to the water flow such as sea bottom tidal current or the like. The direction of the floating body case 63*e* naturally changes along the water flow even when the direction of the water flow changes.

In the power generating part 63 in this state, the turbine 63*a* is rotated by the water flow such as sea bottom tidal current or the like, and power generation is performed by the generator 63*c*. Power generation by the power generating part 63 is maintained even when the direction of the water flow changes. The electric power generated by the power generating part 63 is transmitted to the battery case 30 via the power transmission cable 38*b*. The accommodated detachable portable battery 35 is charged in the battery case 30.

While the electric power generation in the power generating part 63 by the tidal power generation is not so much, the detachable portable battery 35 is fully charged in a few hours. For example, when fishing at sea, the detachable portable battery 35 can be fully charged just by performing an anchoring operation while the anchorage is performed at the fishing ground for several hours.

At the time of return voyage, first, the anchor rope 21*a* is pulled into the hull 11 to raise the anchor, and then, the anchor part 20 is heaved. The heaved anchor part 20 is pulled up to the hull 11 together with the chain cable (anchor chain) 21. At the same time, the power transmission cable 38*b* and the power generating part 63 are also pulled up to the hull 11.

Next, the accommodated detachable portable battery 35 is taken out from the battery case 30 of the anchor part 20 on the hull 11. Further, at the time of outward voyage, the accommodated detachable portable battery 35 is taken out from the battery case 30 that supplies electricity to the electric propulsion part 15 and exchanged with the detachable portable battery 35 charged in the anchor part 20.

Then, in the marine vessel 10, even at the time of return voyage, it is possible to supply power to the electric propulsion part 15 using the detachable portable battery 35 that is fully charged. Accordingly, it is possible to extend the cruising distance.

In the marine vessel 10 of the embodiment, since the detachable portable battery 35 that supplies electricity to the electric propulsion part 15 that causes the hull 11 to cruise can be accommodated in the battery case 30 integrated with the anchor part 20, the battery case 30 and the anchor part 20 are submerged in the sea bottom SB during anchorage of the marine vessel 10, and the detachable portable battery 35 can be charged by the electric power generated by the connected power generating part 63. Accordingly, the weight corresponding to the anchor in the related art can be used as the power supply of the electric propulsion part 15.

Since there is no need to install additional battery, it is possible to increase the cruising distance without increasing the weight of the hull 11. Further, by replacing the detachable portable battery 35 charged during anchorage with the battery case 30 that supplies electricity to the electric propulsion part 15, electric power of the detachable portable battery 35 charged during anchorage can be used during cruising.

The detachable portable battery 35 is set to a capacity that can be fully charged in the time taking to perform anchorage for fishing or the like, the detachable portable battery 35 that has finished charging in the sea is pulled up and exchanged with the detachable portable battery 35 that has finished discharging, and thus, the marine vessel 10 can be used for cruising such as fishing or the like with high energy circulation. In the anchor in the related art, while the electric ship increases the load weight to be carried simply and increases the hull weight for cruising, since the detachable portable battery 35 as the energy source in the embodiment is loaded on the hull 11 and they are moved, the operation with high energy efficiency is possible.

Since the battery case 30 in which the detachable portable battery 35 that is a heavy substance is accommodated is submerged integrally with the anchor part 20 in the water, the necessary weight as the anchor part 20 is provided, and the anchor part 20 can exhibit sufficient holding power.

In addition, since the battery case 30 integrated with the anchor part 20 is connected to the hull 11 by only the chain cable 21 and the anchor rope 21*a* like in the related art, there is no need to route the power transmission cable along the chain cable 21.

Accordingly, the cable needs not have strength comparable to the chain cable 21 and the anchor rope 21*a*. Further, the length of the cable required to maintain the hermeticity is only the length of the power transmission cable 38*b* that connects the battery case 30 and the power generating part 63, making it easy to maintain the hermetic state. Accordingly, it eliminates the difficulty of handling the copper material that becomes the power transmission line, and manufacturing costs can be suppressed.

The detachable portable battery 35 accommodated in the battery case 30 of the anchor part 20 can be charged by the electric power generated by the connected power generating part 63 via the power transmission cable 38*b*.

Since the tidal power generation can be performed by the power generating part 63 where the electric power can be obtained from the sea bottom tidal current or the like, the battery case 30 and the power generating part 63 submerged in the bottom of water during anchoring can charge the detachable portable battery 35 without any electrical connection to the marine vessel other than the chain cable.

Accordingly, the detachable portable battery 35 can be charged only near the sea bottom SB regardless of movement on the board during anchorage. However, the detachable portable battery 35 can be charged without increasing the amount of work on board.

Hereinafter, a second embodiment of a marine vessel according to the present invention will be described with reference to the accompanying drawings.

Figure 5:
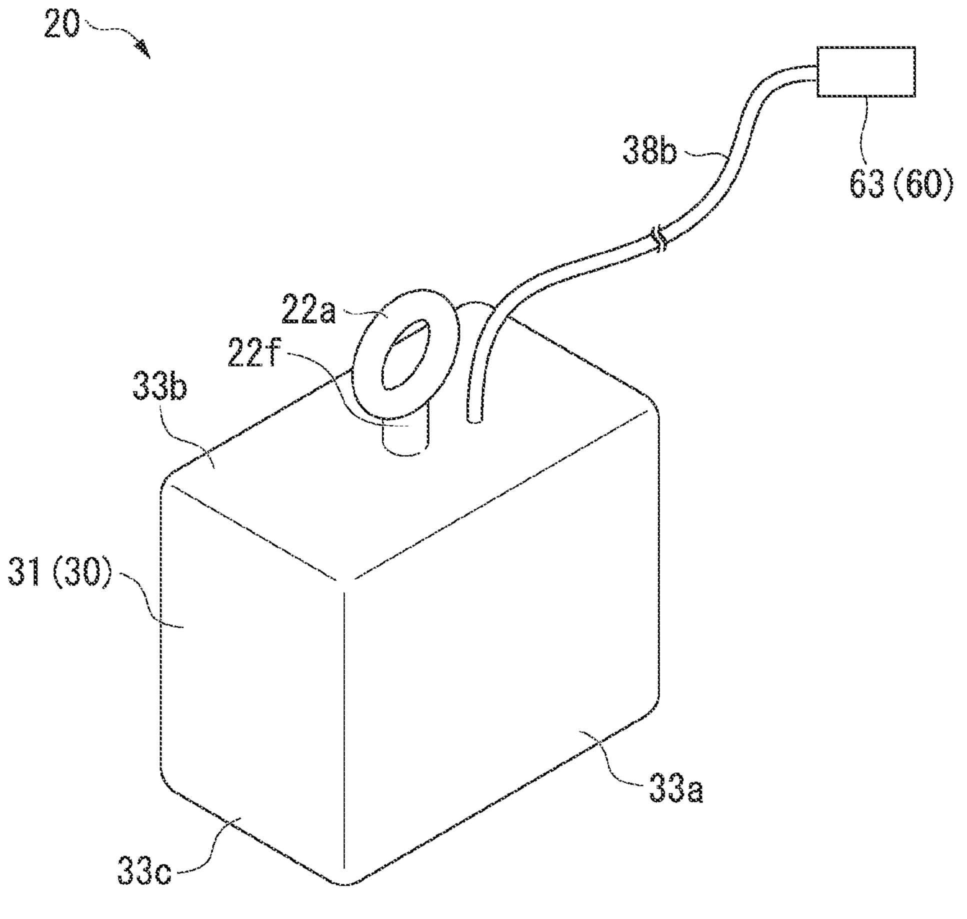
FIG. 5 is a schematic perspective view showing an anchor part in a second embodiment of a marine vessel according to the present invention.

FIG. 5 is a perspective view showing an anchor part of the marine vessel according to the embodiment. The embodiment is distinguished from the first embodiment in a shape of the anchor part, and the other components corresponding to the first embodiment are designated by the same reference signs and description thereof will be omitted.

As shown in FIG. 5, in the anchor part 20 of the embodiment, the ring 22*a* is attached to the battery case 30 via a support section 22*f*. The support section 22*f* is located at a center of a surface 33*b* adjacent to a widest surface 33*a* of the battery case 30. The power transmission cable 38*b* is connected to the surface 33*b* of the battery case 30 in the vicinity of the support section 22*f*. In addition, the one end 31 that can be opened and closed by the lid part is located at a surface 33*c* adjacent to both of the widest surface 33*a* and the surface 33*b* attached to the support section 22*f*.

In the anchor part 20 of the embodiment, the battery case 30 constitutes the anchor part 20. During anchorage, in the anchor part 20 submerged in the sea, the surface 33*a* of the battery case 30 or an opposite surface touches the sea bottom SB. The anchor part 20 of the embodiment can be used on a small marine vessel such as a water scooter or the like. Further, since the weight of the detachable portable battery 35 accommodated in the battery case 30 is several to tens of kg, it is enough weight for a small marine vessel such as a water scooter, an electric boat, or the like. Accordingly, the weight corresponding to the anchor in the related art can be used as the power supply of the electric propulsion part 15 as well as simply carried as a load weight.

In addition, even in a small marine vessel that cannot afford to install the charging part in the hull, it is possible to recharge the detachable portable battery 35 at sea where there is no other way to recharge. Accordingly, it is possible to extend the cruising distance and improve the safety.

In the embodiment, the same effects as the above-mentioned embodiment can be exhibited.

Hereinafter, a third embodiment of a marine vessel according to the present invention will be described with reference to the accompanying drawings.

Figure 6:
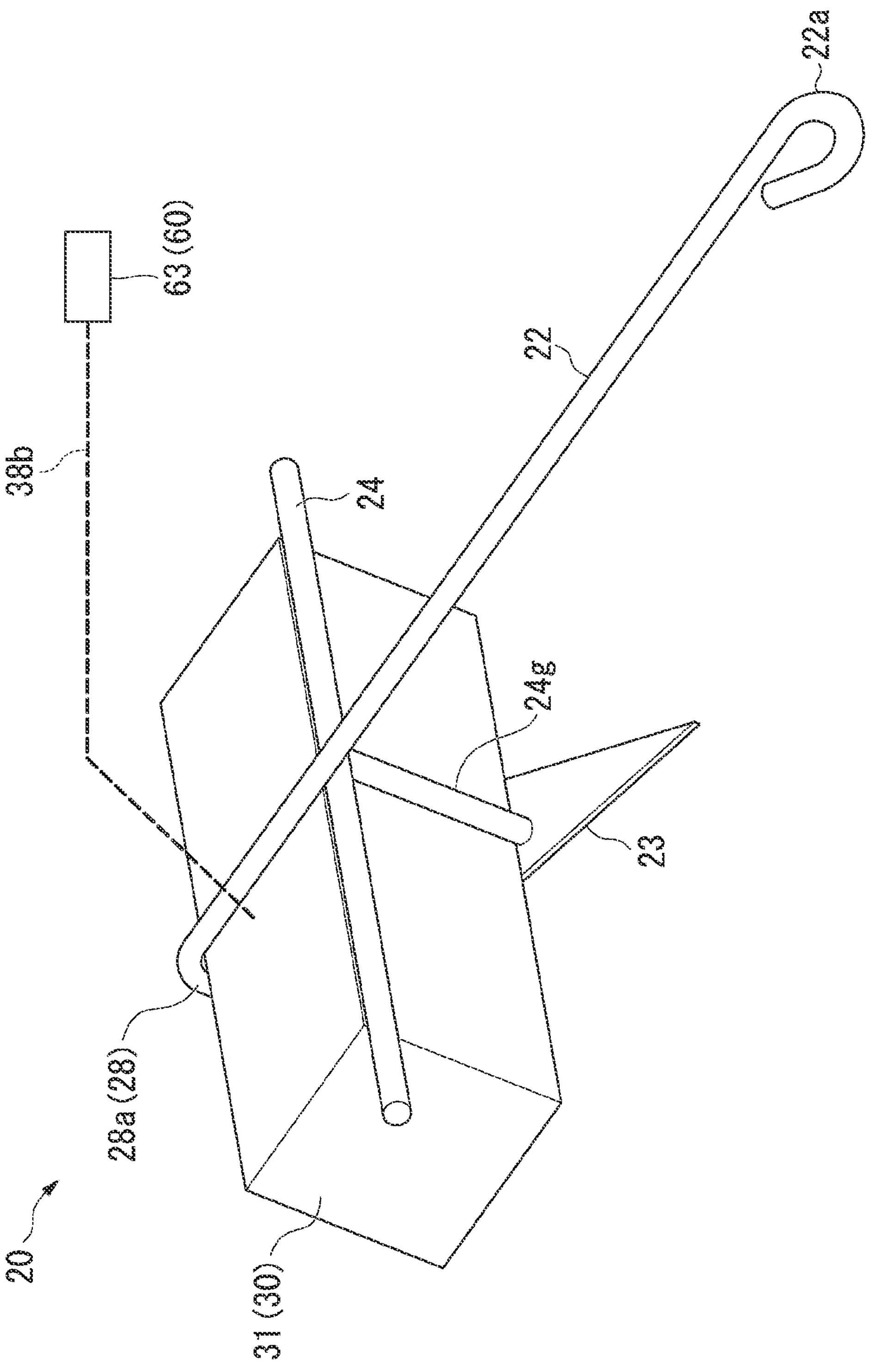
FIG. 6 is a schematic perspective view showing an anchor part in a third embodiment of a marine vessel according to the present invention.

FIG. 6 is a perspective view showing an anchor part of the marine vessel according to the embodiment.

The embodiment is distinguished from the above-mentioned first and second embodiments in a shape of the anchor part, and the other components corresponding thereto are designated by the same reference signs and description thereof will be omitted.

As shown in FIG. 6, the anchor part 20 of the embodiment is a one-armed anchor. In the anchor part 20 of the embodiment, the shank 22 is formed in a rod shape, and the ring 22*a* is formed by curving one end of the rod, which is the shank 22, in an annular shape. The rod, which is the shank 22, is formed linearly to the anchor head 28. The rod, which is the shank 22, forms an anchor head rod 28*a* curved in a direction perpendicular to the anchor head 28. A stock 24 is disposed on the shank 22 adjacent to the anchor head rod 28*a*. The stock 24 is perpendicular to both of a direction in which the shank 22 extends and a direction in which the anchor head rod 28*a* extends. The battery case 30 is attached along the stock 24.

A circumferential surface of the battery case 30 is formed in each of the direction in which the shank 22 extends and the direction in which the anchor head rod 28*a* extends. The stock 24 is disposed along a surface of the circumferential surface of the battery case 30 in contact with the shank 22 and a surface adjacent to the ring 22*a*. The stock 24 is fixed to the shank 22.

The one end 31 of the battery case 30 is located in the vicinity on one end portion of the stock 24. The fluke part 23 of a surface of the circumferential surface of the battery case 30 facing the surface in contact with the shank 22. The fluke part 23 is inclined in a direction in which a tip of the fluke part 23 is separated from the shank 22 rather than a direction parallel to the shank 22. A support section 24*g* extending from a crossing position between the stock 24 and the shank 22 is connected to the fluke part 23.

Four surfaces of the circumferential surface of the battery case 30 in contact with the one end 31 are surrounded by the shank 22, the anchor head rod 28*a*, the fluke part 23, and the support section 24*g*.

The power transmission cable 38*b* is connected to the battery case 30. The power transmission cable 38*b* is connected to a position closer to the one end 31 than the shank 22. The power transmission cable 38*b* is connected to a surface of the circumferential surface of the battery case 30 in contact with the shank 22. Further, the power transmission cable 38*b* can be connected to a surface of the circumferential surface of the battery case 30 in contact with the support section 24*g*.

In the anchor part 20 according to the embodiment, manufacturing costs can be reduced by a simple configuration. In addition, since the four surfaces of the circumferential surface of the battery case 30 in contact with the one end 31 are surrounded by the shank 22, the anchor head rod 28*a*, the fluke part 23, and the support section 24*g*, the anchor part 20 can be manufactured by attaching the shank 22, the anchor head rod 28*a*, the fluke part 23, and the support section 24*g* to the battery case 30. Moreover, in a small marine vessel, the weight required as the anchor part 20 is provided, and the anchor part 20 can exhibit sufficient holding power.

In addition, operational reliability can be improved by setting the connecting place of the power transmission cable 38*b* to the battery case 30 at a position where it is difficult to contact the sea bottom SB or the like.

In the embodiment, the same effects as the above-mentioned embodiments can be exhibited.

Hereinafter, a fourth embodiment of a marine vessel according to the present invention will be described with reference to the accompanying drawings.

Figure 7:
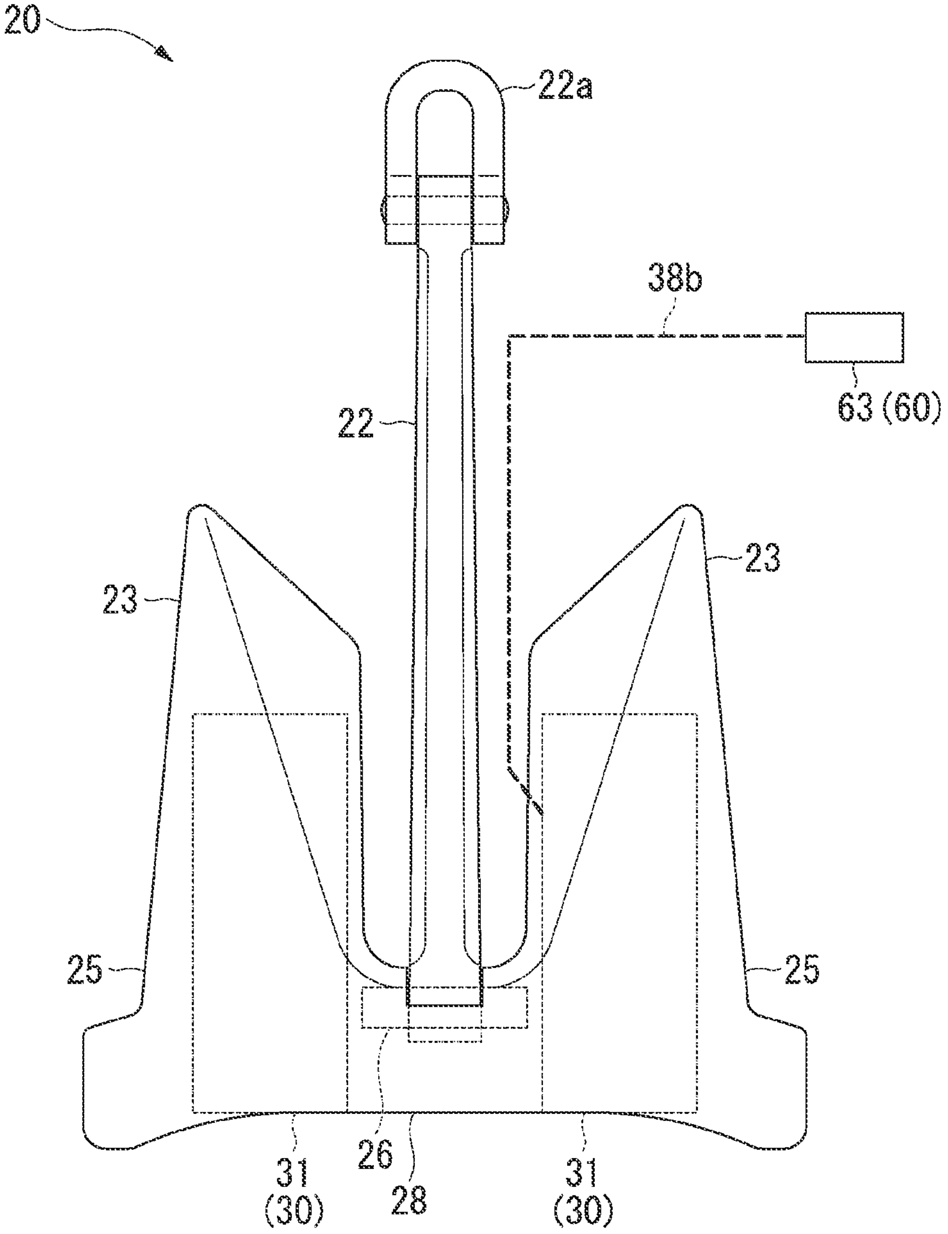
FIG. 7 is a schematic front view showing an anchor part in a fourth embodiment of a marine vessel according to the present invention.

FIG. 7 is a perspective view showing an anchor part of the marine vessel according to the embodiment.

The embodiment is distinguished from the above-mentioned first to third embodiments in a shape of the anchor part, and the other components corresponding thereto are designated by the same reference signs and description thereof will be omitted.

As shown in FIG. 7, the anchor part 20 according to the embodiment is assumed to be available for the large marine vessel 10. In the anchor part 20 according to the embodiment, the battery case 30 is disposed in the vicinity of the anchor head 28. The one end 31 of the battery case 30 according to the embodiment is directed toward the anchor head 28. At the same time, the battery case 30 is formed on an arm section 25 connected to the fluke part 23.

The connecting place of the power transmission cable 38*b* to the battery case 30 can be located at a position in the arm section 25 facing the shank 22.

In addition, since both ends of the anchor head 28 connected to the arm section protrudes in a direction separated from the ring 22*a* along the shank 22, the one end 31 of the battery case 30 can be prevented from coming into contact with the sea bottom SB or the like. Moreover, since the battery cases 30 can be disposed on the fluke parts 23 located on both sides of the shank 22, the number of the detachable portable batteries 35 that can be accommodated can be increased.

In the embodiment, the same effects as the above-mentioned embodiments can be exhibited.

Hereinafter, a fifth embodiment of a marine vessel according to the present invention will be described with reference to the accompanying drawings.

Figure 8:
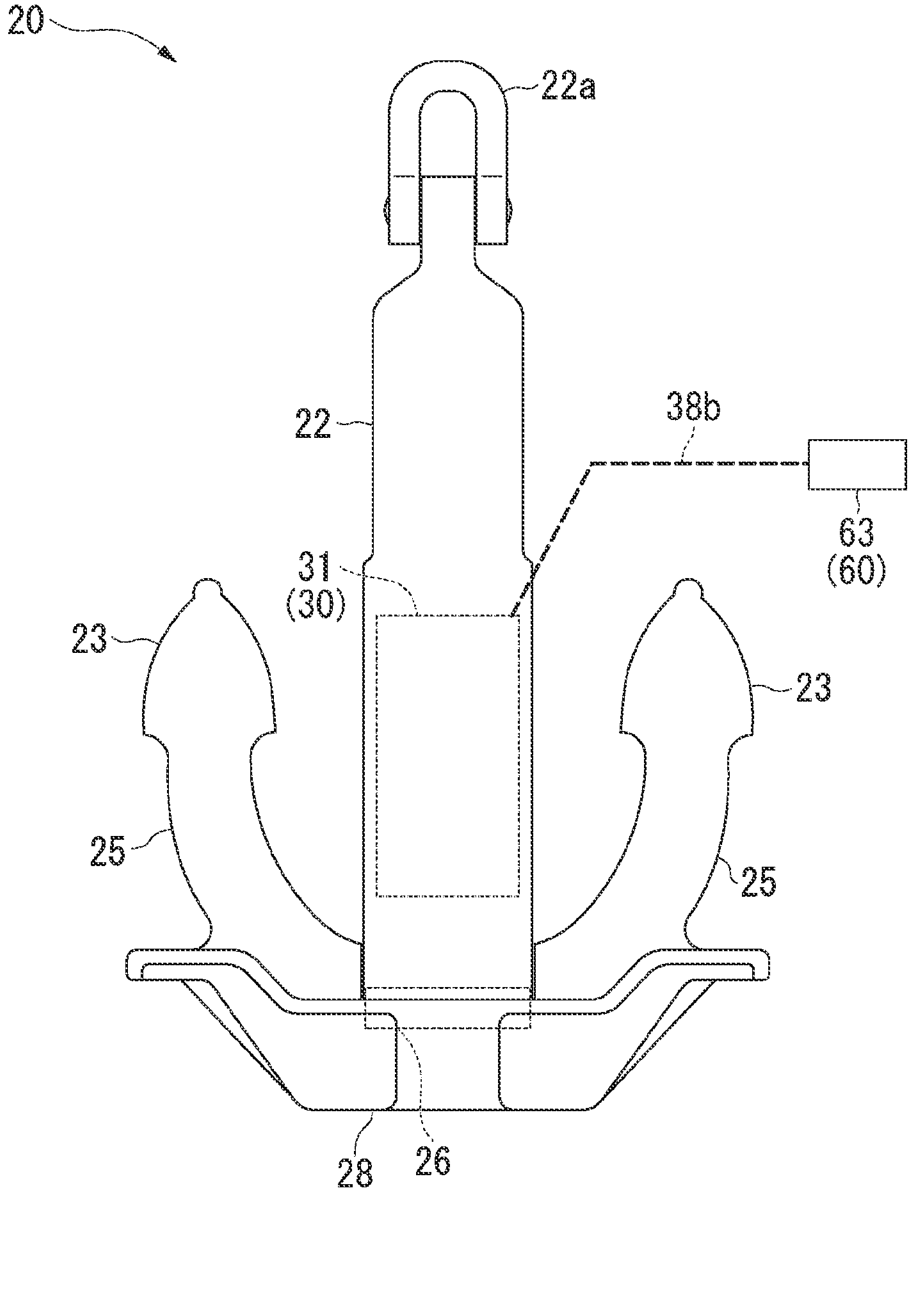
FIG. 8 is a schematic front view showing an anchor part in a fifth embodiment of a marine vessel according to the present invention.

FIG. 8 is a perspective view showing an anchor part of the marine vessel according to the embodiment.

The embodiment is distinguished from the above-mentioned first to fourth embodiments in a shape of the anchor part, and the other components corresponding thereto are designated by the same reference signs and description thereof will be omitted.

As shown in FIG. 8, the anchor part 20 according to the embodiment is assumed to be available for the large marine vessel 10. In the anchor part 20 according to the embodiment, the battery case 30 is disposed in the shank 22. In the embodiment, the one end 31 of the battery case 30 is directed toward the anchor head 28. At the same time, the battery case 30 is formed on the arm section 25 connected to the fluke part 23.

In the embodiment, the same effects as the above-mentioned embodiments can be exhibited.

Further, in the present invention, it is also possible to individually select the components in each of the above-mentioned embodiments and implement them in combination.

In the above-mentioned embodiments, the battery cases 30 can be disposed on the shank 22 and both of the arm sections 25.

In addition, during anchorage, only the anchor part 20 provided with the battery case 30 can be anchored and used without using the power generating part 63 and the power transmission cable 38*b*. In particular, it is effective in a small marine vessel.

DESCRIPTION OF REFERENCE NUMERALS

10 Marine vessel
11 Hull
12 Deck
15 Electric propulsion part
20 Anchor part
21 Chain cable (anchor chain)
21*a* Anchor rope
22 Shank
22*a* Ring
23 Fluke part
24 Stock
25 Arm section
28 Anchor head
38*b* Power transmission cable (cable)
30 Battery case
35 Detachable portable battery
63 Power generating part

What is claimed is:

1. A marine vessel comprising:
a hull;
an electric propulsion part configured to propel the hull;
an anchor part that is connected to a chain cable pulled out from the hull and is submerged in water;
a power generating part submerged in water together with the anchor part; and
a battery case configured to accommodate a detachable portable battery that is an electric power source of the electric propulsion part,
wherein the battery case is integrated with the anchor part and connected to the power generating part.

2. The marine vessel according to claim 1, comprising:
a cable configured to connect the battery case to the power generating part.

3. The marine vessel according to claim 1,
wherein the power generating part is able to generate power using water flow.

4. The marine vessel according to claim 1,
wherein the anchor part has a shank which is connected to the chain cable and on which the battery case is formed.

5. The marine vessel according to claim 1,
wherein the anchor part has a stock which crosses a shank connected to the chain cable and along which the battery case is disposed.

6. The marine vessel according to claim 1,
wherein the anchor part has an anchor head on which the battery case is disposed.

7. The marine vessel according to claim 1,
wherein the anchor part has a shank connected to the chain cable and a fluke part, and
the battery case is disposed at a position where the shank is connected to the fluke part.

8. The marine vessel according to claim 1,
wherein the battery case is disposed within the anchor part.

* * * * *